(12) United States Patent
Wang et al.

(10) Patent No.: US 8,553,788 B2
(45) Date of Patent: Oct. 8, 2013

(54) TECHNIQUES FOR MULTIPLE-SUBCARRIER JOINT PRECODING

(75) Inventors: Dong Wang, Ossining, NY (US); Yue Shang, Natick, MA (US); Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 447 days.

(21) Appl. No.: 12/867,917

(22) PCT Filed: Mar. 9, 2009

(86) PCT No.: PCT/IB2009/050971
§ 371 (c)(1),
(2), (4) Date: Aug. 17, 2010

(87) PCT Pub. No.: WO2009/113008
PCT Pub. Date: Sep. 17, 2009

(65) Prior Publication Data
US 2011/0007828 A1    Jan. 13, 2011

Related U.S. Application Data

(60) Provisional application No. 61/035,142, filed on Mar. 10, 2008, provisional application No. 61/157,230, filed on Mar. 4, 2009.

(51) Int. Cl.
*H04L 27/28* (2006.01)

(52) U.S. Cl.
USPC .......................................... 375/260; 375/285

(58) Field of Classification Search
USPC .................................. 375/260, 295–315, 285
See application file for complete search history.

(56) References Cited

U.S. PATENT DOCUMENTS

2005/0058212 A1 *   3/2005   Shao ............................. 375/260

OTHER PUBLICATIONS

Iran N H et al: "Multidimensional Subcarrier Mapping for Bit-Interleaved Coded OFDM With Iterative Decoding" IEEE Transactions on Signal'Processing, IEEE Service Center, New York, NY, US, vol. 55, No. 12, Dec. 1, 2007, pp. 5772-5781, XP011195708.
Nghi H Tran et al: "Bit-Interleaved Coded OFDM With Signal Space Diversity: Subcarrier Grouping and Rotation Matrix Design" IEEE Transactions on Signal Processing, IEEE Service Center, New York, NY, US, vol. 55, No. 3, Mar. 1, 2007, pp. 1137-1149, XP011165456.
De6ardin V et al: "Impulsive noise on indoor power lines: characterization and mitigation of its effect on PLC systems" Electromagnetic Compatibility, 2003. EMC '03. 2003 IEEE International Symposium on Istanbul, Turkey May 11-16, 2003, Piscataway, NJ, USA,IEEE, vol. 1, May 11, 2003, pp. 166-169, XP010795650.
Z. Wang et al, "OFDM or single-carrier block transmissions?," IEEE Transactions on Communications, vol. 52, pp. 380-394 Mar. 2004.

(Continued)

*Primary Examiner* — Sam K Ahn
*Assistant Examiner* — Janice Tieu
(74) *Attorney, Agent, or Firm* — Larry Liberchuk

(57) ABSTRACT

A method (400) for performing a multiple-sub-carrier-joint-modulation (MSJM) precoding. The method includes grouping input information bits into bit blocks (S410); converting the bit blocks into bit vectors (S420); mapping each of the bit vectors into a symbol vector (S430); and modulating symbol vectors into data subcarriers (S440).

11 Claims, 4 Drawing Sheets

(56) References Cited

OTHER PUBLICATIONS

Z. Wang et al, "Linearly Precoded or Coded OFDM against Wireless Channel Fades," Third IEEE Signal Processing Workshop on Signal Processing Advances in Wireless Communications, Taoyuan, Taiwan, Mar. 20-23, 2001.

\* cited by examiner

| $[b_{m,K}(0), b_{m,K}(1), ..., b_{m,K}(11)]$ | $c_1$ | $c_2$ | $c_3$ |
|---|---|---|---|
| 0000, 0000, 0000 | 0 | 0 | 0 |
| 0000, 0000, 0001 | 0 | 1 | 63 |
| ... | ... | ... | ... |
| 0000, 0100, 0000 | 1 | 0 | 63 |
| 0000, 0100, 0001 | 1 | 1 | 62 |
| ... | ... | ... | ... |
| 0000, 0111, 1111 | 1 | 63 | 0 |
| 0000, 1000, 0000 | 2 | 0 | 62 |
| ... | ... | ... | ... |
| 0000, 1011, 1111 | 2 | 63 | 63 |
| 0000, 1100, 0000 | 3 | 0 | 61 |
| ... | ... | ... | ... |
| 1111, 1111, 1110 | 63 | 62 | 1 |
| 1111, 1111, 1111 | 63 | 63 | 2 |

FIG. 2

TECHNIQUES FOR MULTIPLE-SUBCARRIER JOINT PRECODING

This application claims the benefit from U.S. Provisional Application No. 61/035,142 filed on Mar. 10, 2008 and U.S. Provisional Application No. 61/157,230 filed on Mar. 4, 2009.

The invention relates generally to orthogonal frequency division multiplexing (OFDM) communication systems and, more particularly, to precoding techniques performed by such systems.

The WiMedia standard defines the specifications of a media access control (MAC) layer and a physical (PHY) layer based on orthogonal frequency division multiplexing (OFDM) transmissions. The WiMedia standard enables short-range multimedia file transfers at rates up to 480 Mbps with low power consumption. The standard operates in a frequency band between 3.1 GHz and 10.6 GHz in the UWB spectrum. However, the highest data rate of the WiMedia standard rate cannot meet future wireless multimedia applications, such as HDTV wireless connectivity. An effort is being made to increase the data rates to 1 Gpbs and above.

To this end, weak (or non-channel) channel coding and higher order symbol constellation techniques have been envisioned to be used in future high data rate wireless systems. For example, the WiMedia PHY transfer rate can be increased to 960 Mbps if a ¾ convolutional code together with 16QAM modulation are used. However, precoding of the transmitted OFDM symbols is required to ensure good performance.

The precoding technique is needed to avoid loss of frequency diversity gain results from the characteristics of the OFDM transmission. Specifically, with a weak channel code, the OFDM cannot exploit the frequency diversity effectively. Therefore the channel performance is almost determined by the worst subcarrier, which has the lowest signal-to-noise-ratio (SNR). This limits the number of high data rate applications that be carried by a conventional OFDM wireless system.

To overcome this problem, a few precoding techniques have been discussed in the related art. Generally, the precoding techniques are based on jointly modulating transmit symbols onto multiple subcarriers. This allows a receiver to recover transmit symbols even when some of these subcarriers are in deep fading. Examples for precoding techniques can be found in "OFDM or single-carrier block transmissions?," by Z. Wang, X. Ma and G. B. Giannakis published in IEEE Transactions on Communications, vol. 52, pp. 380-394 March 2004 and in "Linearly Precoded or Coded OFDM against Wireless Channel Fades," by Z. Wang, and G. B. Giannakis published in Third IEEE Signal Processing Workshop on Signal Processing Advances in Wireless Communications, Taoyuan, Taiwan, Mar. 20-23, 2001.

The precoding is typically performed by a precoder circuit coupled to an input of an IFFT OFDM modulator of a transmitter and by a pre-decoder circuit coupled to the output of a FFT OFDM demodulator of a receiver. A well-designed complex precoder can effectively exploit the frequency diversity provided by multi-path channels. However, implementing a complex precoder increases the complexity of the transmitter and receiver as it requires more sophisticated decoding and symbol mapping techniques. For example, the use of dual carrier modulation (DCM) as a precoder requires replacing the QPSK symbol constellation to 16QAM symbol constellation.

Furthermore, to guarantee full frequency diversity (i.e., diversity order of 2) in high data rate modes, a higher constellation (e.g., 256QAM) is required. For example, if a DCM is used to jointly modulate two information symbols s(i) and s(i+50) formed using 16QAM constellation, a frequency diversity order of two is achieved as follows:

$$R = \frac{1}{\sqrt{17}}\begin{bmatrix} 4 & 1 \\ 1 & -4 \end{bmatrix}$$

$$\begin{bmatrix} x(i) \\ x(i+50) \end{bmatrix} = R * \begin{bmatrix} s(i) \\ s(i+50) \end{bmatrix} = \frac{1}{\sqrt{17}}\begin{bmatrix} 4 & 1 \\ 1 & -4 \end{bmatrix} * \begin{bmatrix} s(i) \\ s(i+50) \end{bmatrix}.$$

The information symbols s(i) and s(i+50) are formed using a 16QAM constellation. However, the precoding operation expands the symbol constellation to 256QAM, i.e. the constellation of the precoded symbols x(i) and x(i+50) is 256QAM.

Implementing and designing receivers and transmitters with such a high constellation without affecting the diversity gain and the overall performance of the channel is not feasible. The high constellation is a by-product of the conventional precoding techniques which jointly precode only two symbols to achieve diversity of order two.

It would be therefore advantageous to provide an efficient precoding technique for achieving a frequency diversity order of two while minimizing the size of the constellation.

Certain embodiments of the invention include a method for performing a multiple-subcarrier-joint-modulation (MSJM) precoding. The method comprises grouping input information bits into bit blocks; converting the bit blocks into bit vectors; mapping each of the bit vectors into a symbol vector; and modulating symbol vectors into data subcarriers.

Certain embodiments of the invention also include a computer-readable medium having stored thereon computer executable code for performing a multiple-subcarrier-joint-modulation (MSJM) precoding. The computer executable code causes a computer to execute the process of grouping input information bits into bit blocks; converting the bit blocks into bit vectors; mapping each of the bit vectors into a symbol vector; and modulating symbol vectors into data subcarriers.

Certain embodiments of the invention also include an orthogonal frequency division multiplexing (OFDM) transmitter for performing a multiple-subcarrier-joint-modulation (MSJM) precoding. The OFDM transmitter comprises a first serial-to-parallel (S/P) converter for converting bit blocks into bit vectors; a precoder for mapping each of the bit vectors to a symbol vector; and a second S/P converter for grouping symbol vectors and mapping the symbol vectors into data subcarriers.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 2 is an exemplary lookup table showing the precoding of symbol vectors;

Figure 1:
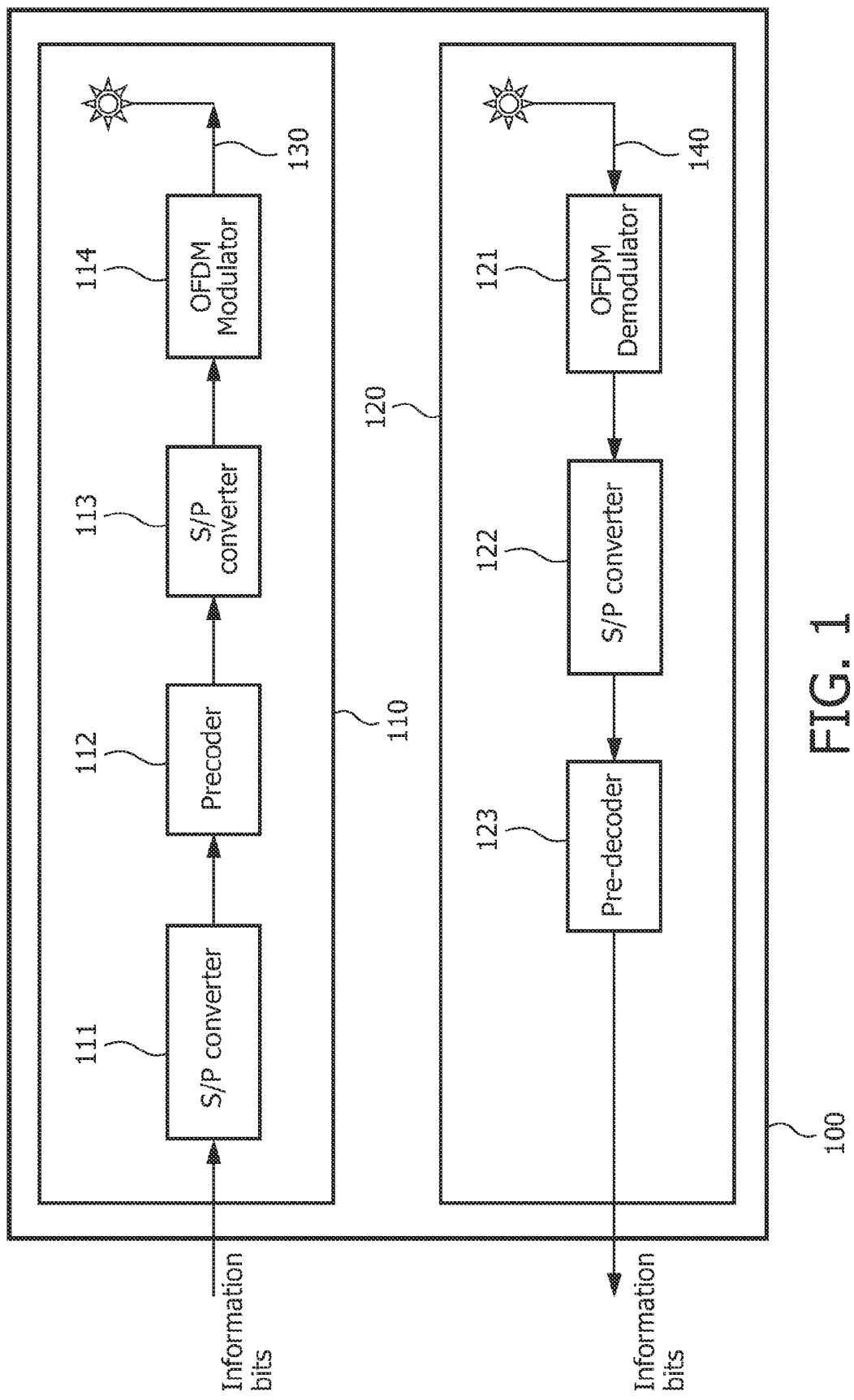
FIG. 1 is a block diagram of an OFDM communication system in accordance with one embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of an OFDM based wireless system 100 used to describe the principles of the invention. The system 100 jointly precodes a number of m (m>2) subcarriers to achieve a frequency diversity order of two, while maintaining a small constellation size. The system 100 may be any type of OFDM based wireless system operating according to wireless communication standards including, but not limited to, WiMedia UWB versions 1.0, 1.5 and 2.0, IEEE 802.11n, WiMax, and so on.

The system 100 comprises a transmitter 110 and a receiver 120 that communicate over a wireless medium. The transmitter 110 includes serial-to-parallel (S/P) converters 111 and 113, a precoder 112, and an OFDM modulator 114. The receiver 120 includes an OFDM demodulator 121, a parallel-to-serial (P/S) converter 122, and a pre-decoder 123. The system 100 also comprises a transmit antenna 130 and a receive antenna 140.

In accordance with principles of the invention, input information bits, preferably after being encoded and interleaved, are partitioned into bit blocks. Each bit block includes n*g bits, where 'n' is a number of available data subcarriers and 'g' is the number of bits to be transmitted per subcarrier. The S/P converter 111 converts each bit block to k bit vectors. For example, the i-th bit vector of the q-th bit block can be represented as follows:

$$\vec{b}_{q,i} = [b_{q,i}(0), b_{q,i}(1), \ldots, b_{q,i}(m*g-1)]$$

The number 'k' is the number of data subcarriers divided by the number of jointly precoded subcarriers, i.e., n/m. Each bit vector includes a number of m*g bits.

In a preferred embodiment of the invention, the precoder 112 utilizes a lookup table to map each bit vector to a symbol vector. A symbol vector includes m symbols, and the symbol vector corresponding to the i-th bit vector of the q-th bit block may be represented as follows:

$$\vec{s}_{q,i} = [s_{q,i}(i_1), s_{q,i}(i_2), \ldots, s_{q,i}(i_m)]$$

When utilizing a lookup table the values of the bit vectors $\vec{b}_{q,i}$ are used as table indexes to retrieve the values of the symbol vectors. The size of the lookup table is $2^{m*g}$ by m. A number $2^{m*g}$ is required in order to achieve a diversity order of two as for any two different bit vectors, their corresponding symbol vectors $\vec{s}_{q,i}$ have at least two symbols in difference. Various embodiments to generate the lookup table are described in detail below.

The symbol vectors are grouped together and mapped into 'n' data subcarriers by the S/P converter 113. The symbol $s_{q,i}(i_e)$, e=1, ... m is transmitted on the $i_e$-th data subcarrier of the q-th OFDM symbol. The OFDM modulator 114 performs an IFFT operation to generate a time-domain transmit signal, which is then transmitted through the transmit antenna 130.

The time-domain transmit signal is received at the receiver 120 and converted to a frequency domain signal through an FFT operation performed by the OFDM demodulator 121.

Then, a number of m-symbol vectors: $\vec{r}_{q,i} = [r_{q,i}(i_1), r_{q,i}(i_2), \ldots, r_{q,i}(i_m)]^T$ are output by the P/S converter 122, where $r_{q,i}(i_e)$ is the received signal of the $i_e$-th data subcarrier of the q-th OFDM symbol and 'T' denotes the matrix transpose operation. The pre-decoder 123 generates information bits using the following equation:

$$\vec{r}_{q,i} = \text{diag}\{\vec{s}_{q,i}\} * \vec{h}_i + \vec{N}_{q,i} \qquad (1)$$

where diag$\{\vec{s}_{q,i}\}$ is a m by m diagonal matrix with the e-th diagonal element equals to $s_{q,i}(i_e)$, e=1, ... m, the vector $\vec{r}_{q,i}$ is a received symbol vector, $\vec{h}_i = [h(i_1), h(i_2), \ldots h(i_m)]^T$ is a channel parameter vector, where $h(i_e)$, e=1, ..., m denotes the channel parameter of the $i_e$-th data subcarrier, and $\vec{N}_{q,i}$ is an additive white Gaussian noise (AWGN) vector.

In accordance with a preferred embodiment of the invention, the pre-decoding can be simplified. In this embodiment, the receiver 120 selects at least m−1 subcarriers (from m subcarriers) having the highest signal-to-noise ratio. The symbol indices of the respective selected subcarriers are pre-decoded separately. Since the precoding technique has a diversity order of two, the pre-decoded m−1 indices are sufficient to recover the bit vector. This significantly reduces the complexity of the pre-decoding process.

Following are non-limiting examples describing the precoding techniques disclosed by the invention. In the following examples the number of jointly precoded subcarriers 'm' is 3, the number of available data subcarriers 'n' is 102, and the number of bits 'g' to be transmitted per subcarrier is 4. The input information bits are grouped into bit blocks, each block includes 102*4=408 bits. Then, 34 (102/3=34) bit vectors are generated, each vector includes 12 (4*3=12) bits. The bit vectors are: $\vec{b}_{q,i} = b_{q,i}(0), b_{q,i}(1), \ldots, b_{q,i}(11)$, i=0, 1, ..., 33.

As the input bit vector $\vec{b}_{q,i}$ has 12 bits, the number of codewords required for the precoding is $2^{12} = 64^2$. Therefore, the minimum constellation size for symbols $s_q(i)$ to achieve diversity order of two is 64. Thus, the precoding technique according to the invention increases the constellation size by a power of 2 (e.g., 16QAM to 64QAM) in comparison to other conventional techniques, such as the DCM that increases the constellation size at least by a power of 4 (e.g., 16QAM to 256QAM).

The precoder 112 maps each bit vector $\vec{b}_{q,i}$ to a symbol vector $\vec{s}_{q,i} = [s_q(i), s_q(i+34), s_q(i+68)]$, in which all three symbols are from a 64-QAM constellation. The symbols $s_q(i)$, $s_q(i+34)$, and $s_q(i+68)$ are transmitted on the i-th, (i+34)-th and (i+68)-th data subcarriers of the q-th OFDM symbol, respectively. As mentioned above, the mapping is performed using a lookup table. In this example, the table includes $2^{12}$ (or $64^2$) rows and 3 columns. FIG. 2 is an example of a lookup table generated in accordance with one embodiment of the invention. The values $c_1$, $c_2$, and $c_3$ are the values of the symbols in $s_q(i)$, $s_q(i+34)$, and $s_q(i+68)$ in the symbol vector. To generate the lookup table, the values of $c_1$ and $c_2$ columns are computed using the value of $$[b_{q,i}(0), b_{q,i}(1), \ldots, b_{q,i}(5)]\left(\sum_{j=0}^{5} b_{q,i}(j) 2^j\right)$$

for $c_1$ and the values of $$[b_{q,i}(6), b_{q,i}(7), \ldots, b_{q,i}(11)] \left( \sum_{j=0}^{5} b_{q,i}(j+6) 2^j \right)$$

for $c_2$.

In accordance with one embodiment of the invention, the mapping values for $c_3$ is determined using any Latin 2-hypercube of order 64, (or a 64 by 64 Latin square matrix). A Latin z-hypercube of order v is a z-dimensional array in which each row is a permutation of symbols $0, 1, \ldots, v-1$. A Latin matrix is an 'l by l square matrix with cells containing 'l' different symbols (from 0 to (l−1)) where no symbol occurs more than once in any row or column. Specifically, the d-th element of $c_3$ column, where $d-1=x*64+y$, $0 \le x, y \le 63$, is the (x+1,y+1)-th element of a 64 by 64 Latin square matrix. As an example the following Latin matrix can be used for mapping the values of $c_3$:

$$M = \begin{bmatrix} 0 & 63 & 62 & \ldots & 1 \\ 63 & 62 & 61 & \ldots & 0 \\ 62 & 61 & 60 & \ldots & 63 \\ \ldots & \ldots & \ldots & \ldots & \ldots \\ 1 & 0 & 63 & \ldots & 2 \end{bmatrix}$$

This matrix allows to express the values of $c_3$ using a non-binary operation, i.e., $c_3=\mathrm{mod}(64-c_2-c_1, 64)$. The $c_3$ values shown in FIG. 2 are computed using this modulo-64 operation. The precoding allows achieving diversity order of two as any two different rows of the lookup table include at least two symbols in difference.

It would be noted that any type (special or non-special) Latin matrices can be used to determine the values of the symbols. It should be further noted that different Latin matrices and different symbol constellation labelling (i.e., mapping between the symbol indices and the points on the symbol constellation) may result with different precoding techniques, which may have different performance. This allows selecting constellation labelling and a Latin square matrix to optimize the performance of the system.

In another embodiment the $c_3$ values may be determined according to a binary operation defined as follows:

$$[p_{q,i}(0), p_{q,i}(1), \ldots, p_{q,i}(5)] = [b_{q,i}(0), b_{q,i}(1), \ldots, b_{q,i}(11)]*G,$$

Where G equals to:

$$G = \begin{pmatrix} 1 & 1 & 0 & 1 & 0 & 0 \\ 1 & 0 & 1 & 0 & 1 & 0 \\ 1 & 1 & 0 & 1 & 1 & 1 \\ 0 & 1 & 1 & 0 & 0 & 1 \\ 1 & 1 & 0 & 0 & 0 & 1 \\ 1 & 0 & 0 & 1 & 0 & 1 \\ 0 & 0 & 1 & 0 & 1 & 1 \\ 0 & 1 & 0 & 1 & 0 & 1 \\ 1 & 1 & 1 & 0 & 1 & 1 \\ 1 & 0 & 0 & 1 & 1 & 0 \\ 1 & 0 & 0 & 0 & 1 & 1 \\ 1 & 0 & 1 & 0 & 0 & 1 \end{pmatrix}$$

and the values of $c_3$ column can be computed using the value of $[p_{q,i}(0), p_{q,i}(1), \ldots, p_{q,i}(5)]$ as $$\left( \sum_{j=0}^{5} p_{q,i}(j) 2^j \right).$$

When the mapping of bit vectors to a symbol vectors is completed, all the 34 output symbol vectors $\vec{s}_{q,i}$, $i=0, 1, \ldots, 33$ are grouped together and mapped onto 102 data subcarriers.

Figure 3:
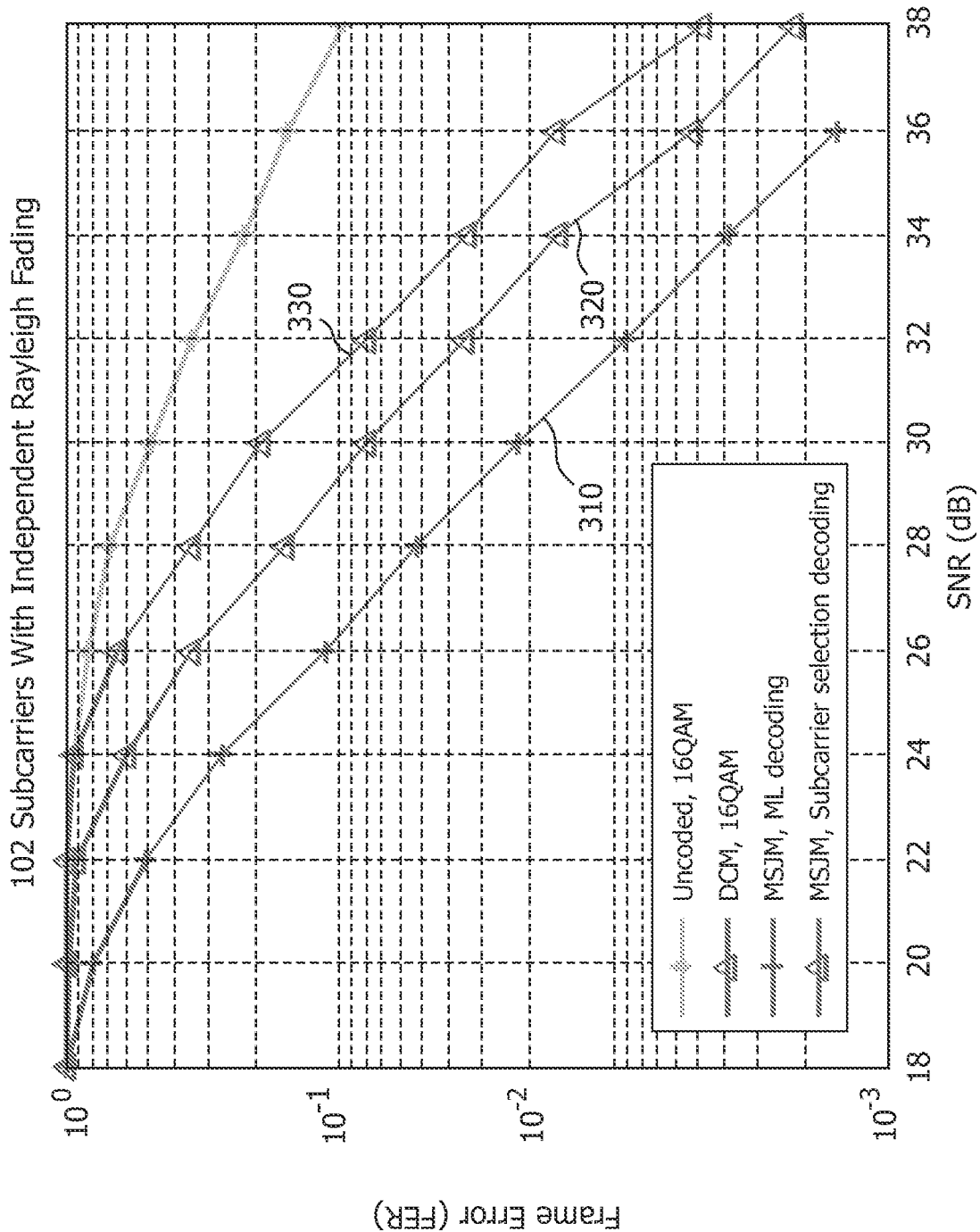
FIG. 3 is a graph showing simulation results of the multiple-subcarrier-joint-modulation (MSJM) precoding.

FIG. 3 shows simulation results demonstrating the performance of the precoding technique implemented in accordance with one embodiment of the invention. In the simulations, 102 data subcarriers are used. The precoding ("MSJM precoding") is done using a combination of a predefined Latin matrix and a Gray QAM labelling under the assumption that all data subcarriers channels are i.i.d. Rayleigh fading channels. As can be noticed, the gain (indicated by a curve 310) of the MSJM decoding (respective to the MSJM precoding) is better than the gain of the conventional DCM precoding with 16QAM (as indicated by a curve 320). Using the simplified precoding/pre-decoding technique results in gain performance (as indicated by a curve 330) which is lower than the MSJM precoding. However the pre-decoding is less complex. It will be appreciated that the inventive technique has a good performance-complexity trade-off.

Figure 4:
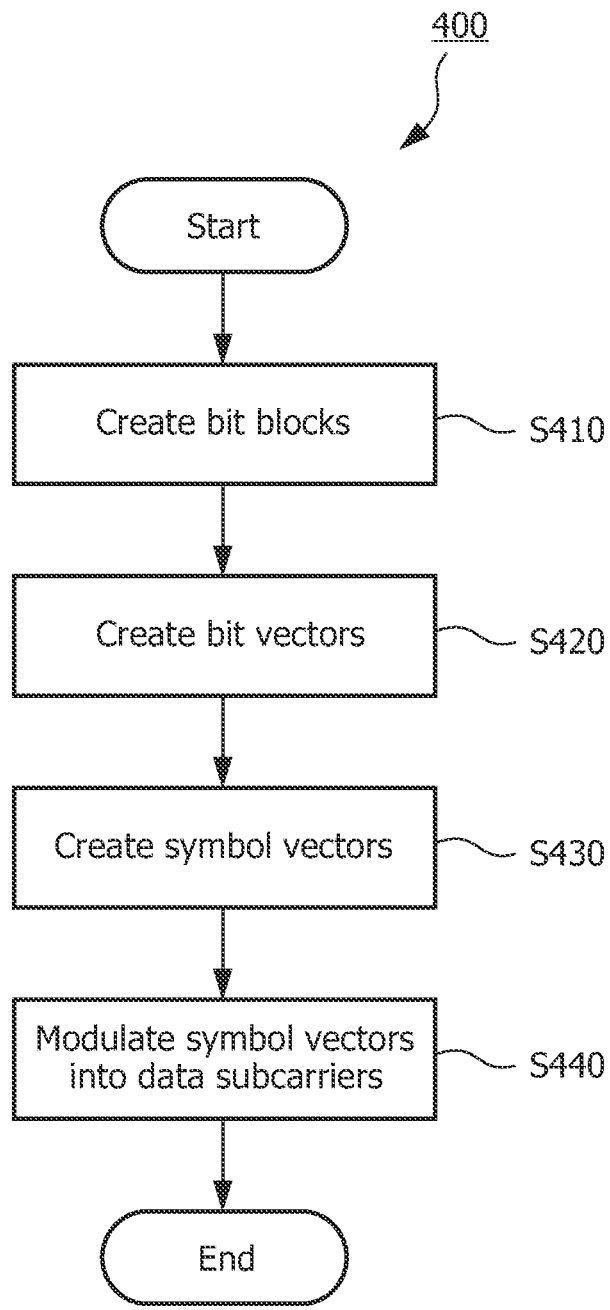
FIG. 4 is a flowchart describing an exemplary method for performing the MSJM precoding implemented in accordance with an embodiment of the invention.

FIG. 4 shows a non-limiting flowchart 400 describing the method for performing a multiple-subcarrier-joint-modulation (MSJM) precoding implemented in accordance with an embodiment of the invention. At S410, input information bits are grouped into bit blocks, each of which includes a number of n*g bits. The parameter 'n' is the number of available subcarriers, and 'g' is the number of bits to be transmitted per carrier. At S420, bit blocks are converted into bit vectors. The number of bit vectors is equal to the number of data subcarriers divided by the number of jointly precoded subcarriers, i.e., n/m. At S430, each bit vector is mapped into a symbol vector that includes a number of m symbols. In a preferred embodiment the mapping is performed using a lookup table having $2^{g*m}$ rows and m columns.

To construct the lookup table, first a table that includes $Q^{m-1}$ rows and m columns is generated. The parameter Q is the constellation size and is determined to be the minimum integer size that satisfies the equation:

$$\log_2 Q \le m*g/(m-1).$$

The values of the first 'm−1' columns are set using one of the techniques mentioned in detail above. Then a Latin (m−1)-hypercube of order Q is inserted (row-wise) to the last (m) column. The last step in constructing the lookup table includes selection from the $Q^{m-1}$ by m table, $2^{g*m}$ different rows.

At S440, the symbol vectors are modulated onto the 'n' data subcarriers and transmitted. It is appreciated that the MSJM precoding enables to increase the data rates of transmission with improved gain performance and minimum symbol constellation expansion.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. A method for performing a multiple-subcarrier-joint-modulation (MSJM) precoding, comprising:
    grouping input information bits into bit blocks, wherein each bit block includes n*g bits, wherein n is a number of available subcarriers and g is a number of bits to be transmitted per subcarrier;
    converting the bit blocks into k bit vectors, wherein k is the number of available subcarriers n divided by a number of jointly precoded subcarriers m, wherein each bit vector includes m*g bits;
    mapping each of the bit vectors into a symbol vector, wherein the symbol vector includes m symbols; and
    modulating symbol vectors into data subcarriers.

2. The method of claim 1, wherein a minimum constellation size requires that modulating the symbols is a function of the number of bits within a bit vector.

3. The method of claim 2, wherein the mapping of each of the bit vectors into the symbol vector is performed using a lookup table, wherein a number of rows in the lookup table equals to the constellation size to a power of (m−1) and a number of columns in the lookup table equals to the number of symbols in a symbol vectors.

4. The method of claim 3, further comprising generating the lookup table by:
    generating a table, wherein a number of rows and columns of the table equal to the number of rows and columns of the lookup table;
    determining mapping values for first m−1 symbols in the symbol vector by setting values in first m−1 columns in the table;
    row-wise inserting a Latin (m−1)-hypercube in the last column of the table; and
    selecting rows having different values to construct the lookup table, wherein any two different rows in the lookup table include at least two symbols in difference.

5. The method of claim 4, wherein the values of first m−1 columns are determined using at least one of: values of bits of the bit vector, binary operations, non-binary operations, and a constellation labelling.

6. A non-transitory computer-readable medium having stored thereon computer executable code for performing a multiple-subcarrier-joint-modulation (MSJM) precoding, comprising:
    grouping input information bits into bit blocks, wherein each bit block includes n*g bits, wherein n is a number of available subcarriers and g is a number of bits to be transmitted per subcarrier;
    converting the bit blocks into k bit vectors, wherein k is the number of available subcarriers n divided by a number of jointly precoded subcarriers m, wherein each bit vector includes m*g bits;
    mapping each of the bit vectors into a symbol vector, wherein the symbol vector includes m symbols; and
    modulating symbol vectors into data subcarriers.

7. An orthogonal frequency division multiplexing (OFDM) transmitter for performing a multiple-subcarrier-joint-modulation (MSJM) precoding, comprising:
    a first serial-to-parallel (S/P) converter for converting bit blocks into k bit vectors, wherein each bit block includes n*g bits, wherein n is a number of available subcarriers and g is a number of bits to be transmitted per subcarrier, wherein k is the number of available subcarriers n divided by a number of jointly precoded subcarriers m, wherein each bit vector includes m*g bits s;
    a precoder for mapping each of the bit vectors to a symbol vector, wherein the symbol vector includes m symbols; and
    a second S/P converter for grouping symbol vectors and mapping the symbol vectors into data subcarriers.

8. The OFDM transmitter of claim 7, further comprising an OFDM modulator for generating a time-domain signal to be transmitted over a wireless medium.

9. The OFDM transmitter of claim 8, wherein the mapping of each of the bit vectors into the symbol vector is performed using a lookup table.

10. The OFDM transmitter of claim 9, wherein any two different rows of the lookup table include at least two symbols in difference.

11. The OFDM transmitter of claim 10, wherein values of columns in the lookup table are determined using at least one of: a Latin hypercube, a Latin matrix, values of bits of the bit vector, binary operations, non-binary operations, and a constellation labelling.

* * * * *